(12) United States Patent
Lee

(10) Patent No.: US 12,613,937 B2
(45) Date of Patent: Apr. 28, 2026

(54) IDENTITY RECOGNITION METHOD AND IDENTITY RECOGNITION SYSTEM

(71) Applicant: National Tsing Hua University, Hsinchu City (TW)

(72) Inventor: Yun-Ju Lee, Hsinchu City (TW)

(73) Assignee: NATIONAL TSING HUA UNIVERSITY, Hsinchu City (TW)

( * ) Notice: Subject to any disclaimer, the term of this patent is extended or adjusted under 35 U.S.C. 154(b) by 897 days.

(21) Appl. No.: 17/944,595

(22) Filed: Sep. 14, 2022

(65) Prior Publication Data

US 2023/0376567 A1 Nov. 23, 2023

(30) Foreign Application Priority Data

May 20, 2022 (TW) .................................. 111118849

(51) Int. Cl.
*G06F 18/214* (2023.01)
*G01P 3/02* (2006.01)
(Continued)

(52) U.S. Cl.
CPC ............ *G06F 18/2148* (2023.01); *G01P 3/02* (2013.01); *G01P 15/14* (2013.01); *G01P 15/18* (2013.01); *G06F 18/213* (2023.01); *G06N 3/08* (2013.01)

(58) Field of Classification Search
CPC ...... G06F 18/2148; G06F 18/213; G01P 3/02; G01P 15/14; G01P 15/18; G06N 3/08;
(Continued)

(56) References Cited

U.S. PATENT DOCUMENTS

| | | | | |
|---|---|---|---|---|
| 2010/0145236 A1* | 6/2010 | Greenberg | ........... | G04G 21/025 |
| | | | | 600/595 |
| 2018/0060758 A1* | 3/2018 | Alexandrov | ............ | G06F 17/16 |
| 2019/0388008 A1* | 12/2019 | Lee | ...................... | A61B 5/1038 |

FOREIGN PATENT DOCUMENTS

TW I681756 B 1/2020

OTHER PUBLICATIONS

Adel et al. (Inertial Gait-based Person Authentication Using Siamese Networks, published 2021, 2021 International Joint Conference on Neural Networks (IJCNN) | 978-1-6654-3900-8) (Year: 2021).*

(Continued)

*Primary Examiner* — Michelle T Bechtold
*Assistant Examiner* — Aaron P Gormley
(74) *Attorney, Agent, or Firm* — Birch, Stewart, Kolasch & Birch, LLP

(57) ABSTRACT

An identity recognition method includes a step of storing multiple training data sets that respectively correspond to gaits of multiple members, a step of obtaining a gait similarity estimation model that is established by training a Siamese neural network using the training data sets, a step of obtaining a piece of inertial data that corresponds to a step taken by a user, a step of generating, based on the piece of inertial data, a piece of feature data that is related to gait of the step taken by the user, a step of generating, based on the piece of feature data and the training data sets, multiple evaluation results that respectively correspond to the training data sets by using the gait similarity estimation model, and a step of determining whether the user belongs to a group consisting of the members based on the evaluation results and a predefined threshold.

12 Claims, 5 Drawing Sheets

(51) Int. Cl.
　　*G01P 15/14* 　　(2013.01)
　　*G01P 15/18* 　　(2013.01)
　　*G06F 18/213* 　(2023.01)
　　*G06N 3/08* 　　(2023.01)

(58) Field of Classification Search
　　CPC .... G06N 3/045; G06V 10/774; G06V 10/776;
　　　　　　　　　　　　　G06V 10/82; G06V 40/25
　　See application file for complete search history.

(56) References Cited

OTHER PUBLICATIONS

Bank et al. (Improved Training for Self Training by Confidence Assessments, published 2018, arXiv:1710.00209v2) (Year: 2018).*
Pan et al. (Indoor Person Identification through Footstep Induced Structural Vibration, published 2015, 2015 ACM 978-1-4503-3391—Jul. 15, 2002) (Year: 2015).*
Wu et al. (IMU Sensors Beneath Walking Surface for Ground Reaction Force Prediction in Gait, IEEE Sensors Journal, vol. 20, No. 16, Aug. 15, 2020) (Year: 2020).*
Kumar et al. (Gait recognition based on vision systems: A systematic survey, vol. 75, 2021, 103052, ISSN 1047-3203, https://www.sciencedirect.com/science/article/pii/S1047320321000249) (Year: 2021).*

* cited by examiner

IDENTITY RECOGNITION METHOD AND IDENTITY RECOGNITION SYSTEM

CROSS-REFERENCE TO RELATED APPLICATION

This application claims priority to Taiwanese Invention Patent Application No. 111118849, filed on May 20, 2022.

FIELD

The disclosure relates to identity recognition, and more particularly to an identity recognition method and an identity recognition system based on gait analysis.

BACKGROUND

Biometric authentication technologies have been widely used for personal identification. In practice, a user whose identity is to be recognized is required to be in close proximity to a sensor in order to facilitate successful collection of feature information that is related to a biometric feature, such as fingerprint, face, iris, etc. However, the above-mentioned biometric features are static features and can be easily forged. In addition, the collection of the feature information is usually not conducted in private, which may cause privacy concerns.

SUMMARY

Therefore, an object of the disclosure is to provide an identity recognition method and an identity recognition system that can alleviate at least one of the drawbacks of the prior art.

Gait recognition technology may be utilized in the field of personal identity recognition. Gait features or gait information to be collected and analyzed in the gait recognition technology at least have advantages of being portable, free from memory, unique, difficult to copy or counterfeit, collectable in a non-contact way, etc.

The disclosure is related to identity recognition method and system that use machine learning in combination with gait analysis to promote accuracy and privacy of personal identity recognition.

According to the disclosure, the identity recognition method is adapted for determining whether a user belongs to a group consisting of P number of members based on gait recognition, where P is a positive integer. The identity recognition method is to be implemented by an identity recognition system, and comprises: a step of storing P number of training data sets that respectively correspond to the P number of members and that are respectively related to gaits of the P number of members, where each of the P number of training data sets includes Q pieces of training feature data that respectively correspond to Q number of steps taken by the corresponding one of the P number of members on at least one sensor mat and that were obtained based on an inertial sensing result generated by the at least one sensor mat which is capable of detecting vibrations with respect to multiple inertial features, where Q is an integer greater than one; a step of obtaining a gait similarity estimation model that is established by training a Siamese neural network using the P number of training data sets in such a manner that, for each round of training, two pieces of training feature data, which are selected from among the P number of training data sets as two pieces of input data and which respectively correspond to two different steps, are simultaneously inputted into the Siamese neural network to adjust weights used by the Siamese neural network; a step of obtaining at lease one piece of inertial data that corresponds to a step taken by the user on the at least one sensor mat and that is generated by the at least one sensor mat which detects vibrations resulting from the step with respect to the inertial features; a step of generating, based on the at least one piece of inertial data, a piece of feature data that is related to gait of the step taken by the user; a step of generating, based on the piece of feature data and the P number of training data sets, P number of evaluation results that respectively correspond to the P number of training data sets by using the gait similarity estimation mode, wherein, with respect to each of the P number of training data sets, the corresponding evaluation result includes Q number of similarity values each between the piece of feature data and a respective one of the Q pieces of training feature data of the training data set; and a step of determining whether the user belongs to the group consisting of the P number of members based on the P number of evaluation results and a predefined threshold.

According to the disclosure, the identity recognition system is adapted for determining whether a user belongs to a group consisting of P number of members based on gait recognition, where P is a positive integer. The identity recognition system includes a sensor mat, a storage device, a signal receiver and a processor. The sensor mat includes a mat body, and multiple inertial sensors. The mat body has a top surface and a bottom surface opposite to each other, and multiple inertial sensors arranged in an array on the bottom surface of the mat body. Each of the inertial sensors includes an inertial sensing module, a microcontroller and a signal transmitter. The inertial sensing module is configured to detect vibrations of the mat body with respect to multiple inertial features to generate sensing data that is related to the inertial features. The microcontroller is electrically connected to the inertial sensing module, and is configured to receive the sensing data from the inertial sensing module, to perform filtering on the sensing data, and to extract a segment of the sensing data thus filtered to serve as a piece of inertial data, wherein the segment corresponds to a period of time during which the mat body vibrated. The signal transmitter is electrically connected to the microcontroller, and is configured to receive the piece of inertial data from the microcontroller, and to transmit the piece of inertial data through radio waves at a radio frequency. The storage device stores P number of training data sets that respectively correspond to the P number of members and that are respectively related to gaits of the P number of members, and stores a gait similarity estimation model that is established by training a Siamese neural network using the P number of training data sets. Each of the P number of training data sets includes Q pieces of training feature data that respectively correspond to Q number of steps taken by a corresponding one of the P number of members on the top surface of the mat body and that are obtained based on an inertial sensing result generated by the sensor mat, where Q is an integer greater than one. The signal receiver is configured to wirelessly receive the pieces of inertial data transmitted by the signal transmitters of the inertial sensors. The processor is electrically connected to the signal receiver, and is configured to obtain the pieces of inertial data that corresponds to a step taken by the user on the sensor mat and that are generated by the inertial sensors which detect vibrations resulting from the step with respect to the inertial features, to generate, based on the pieces of inertial data, a piece of feature data that is related to gait of the step taken by the user. The processor is further configured to generate, based on the piece of feature data and the P number of training data sets, P number of evaluation results that respectively correspond to the P number of training data sets by using the gait similarity estimation model, wherein, with respect to each of the P number of training data sets, the corresponding evaluation result includes Q number of similarity values each between the piece of feature data and a respective one of the Q pieces of training feature data of the training data set. The processor is further configured to determine whether the user belongs to the group consisting of the P number of members based on the P number of evaluation results and a predefined threshold.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
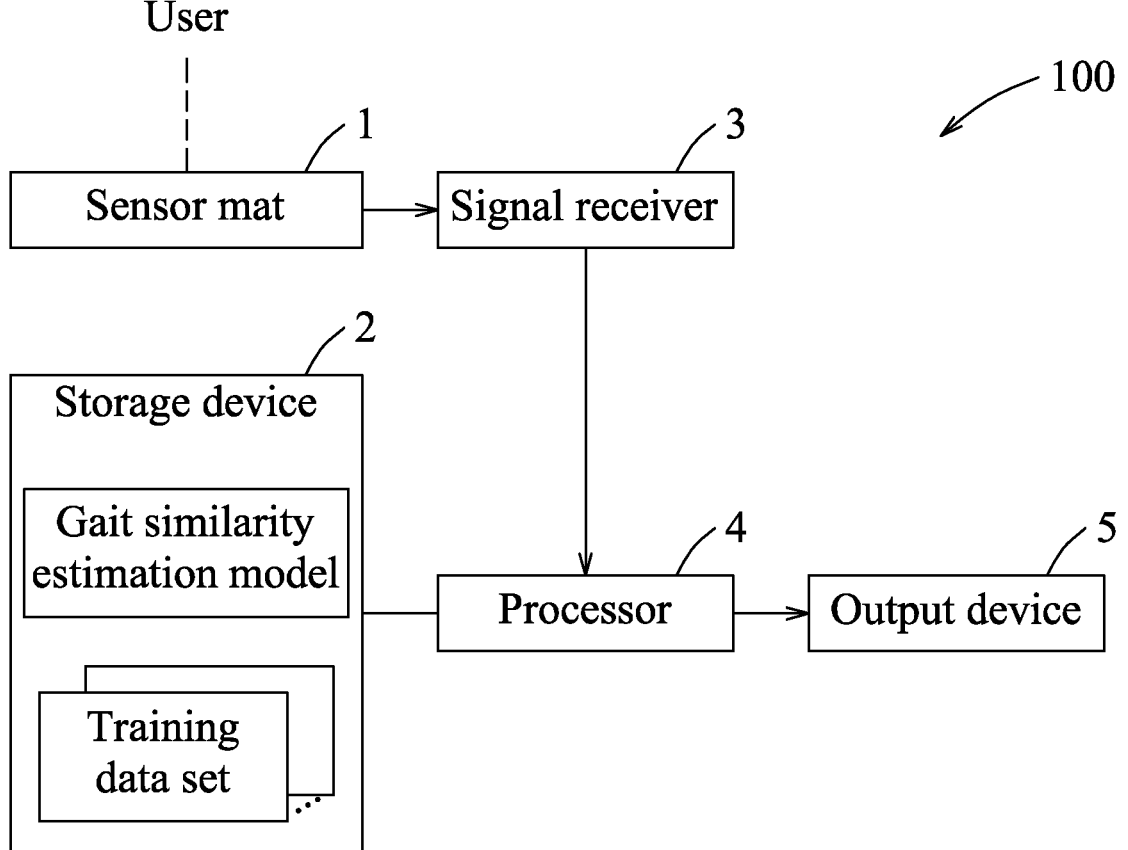
FIG. 1 is block diagram illustrating an embodiment of an identity recognition system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an identity recognition system 100 according to an embodiment of the disclosure is illustrated. The identity recognition system 100 is adapted for determining, based on gait recognition, whether a user belongs to a group consisting of P number of members, where P is a positive integer. It is noted herein that every person has a unique style of walking, also known as a unique gait pattern, and likewise, when taking a single step, every person would make a unique foot gesture. As used herein, "gait" generally refers to the style of walking, taking a stride, or taking a single step, and in the context of a single step, gait of a user may refer to a foot gesture pattern or a set of foot gestures made by the user while taking the step. For example, if the identity recognition system 100 is applied to a household door lock system, the group would include people (e.g., family members, housemates, etc.) living in the house, and if the identity recognition system 100 is applied to an access control system of a business or an institution, the group would include the staff of the business or institution. The identity recognition system 100 includes at least one sensor mat 1, a storage device 2, a signal receiver 3, a processor 4 that is electrically connected to the storage device 2 and the signal receiver 3, and an output device 5 that is electrically connected to the processor 4. In some embodiments, the storage device 2, the signal receiver 3, the processor 4 and the output device 5 cooperate to form a computing system, such as a desktop computer, a notebook computer, a tablet or a smart device.

Figure 2:
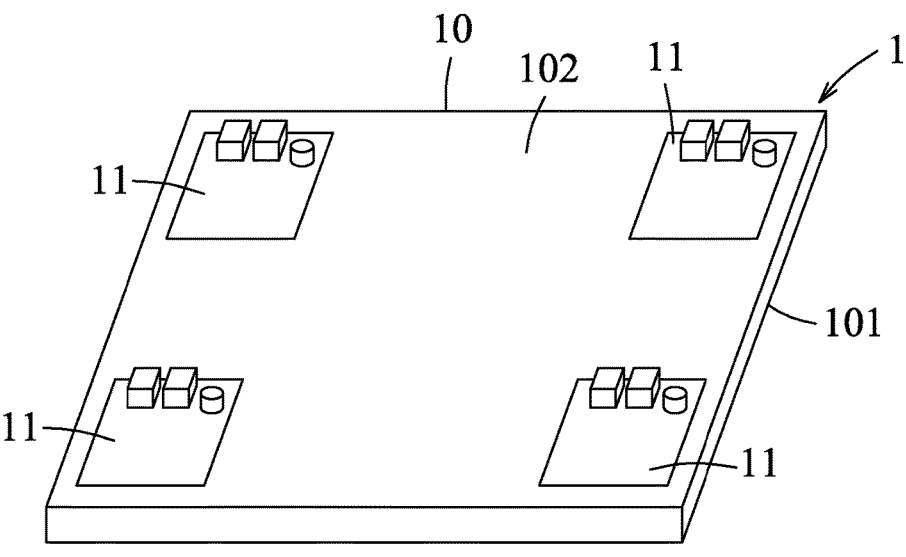
FIG. 2 is a perspective view illustrating an embodiment of a sensor mat according to the disclosure.

Referring to FIG. 2, each of the at least one sensor mat 1 includes a mat body 10 that has a top surface 101 and a bottom surface 102 opposite to each other, and multiple (e.g., four) inertial sensors 11 that are arranged in an array on the bottom surface 102 of the mat body 10. In some embodiments, the mat body 10 has a size the same as a foam floor tile (e.g., 12×12 inches), and four inertial sensors 11 are arranged in four corners of the bottom surface 102. In some embodiments, each of the at least one sensor mat 1 may have a larger size (e.g., 24×24 inches), and may include more than four inertial sensors 11 that are arranged in an array (e.g., 2×3 or 2×4).

Figure 3:
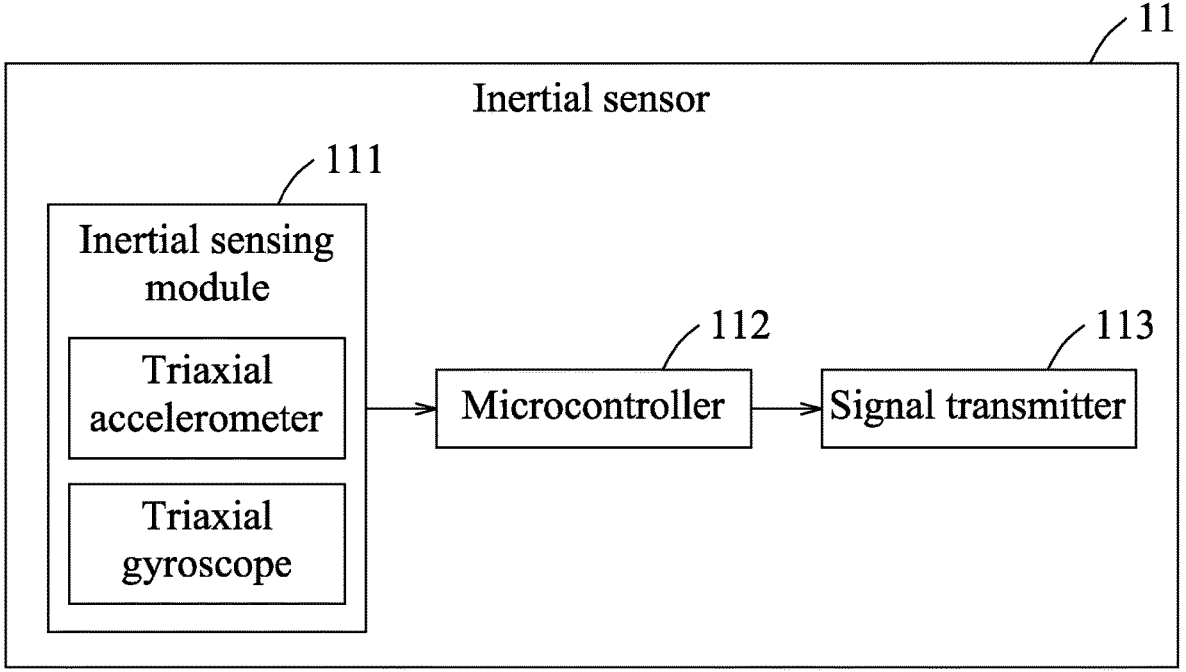
FIG. 3 is a block diagram illustrating an embodiment of an inertial sensor according to the disclosure.

Referring to FIG. 3, each of the inertial sensors 11 includes an inertial sensing module 111, a microcontroller 12 electrically connected to the inertial sensing module 111, and a signal transmitter 113 electrically connected to the microcontroller 112. In some embodiments, the inertial sensing module 111 includes a triaxial accelerometer and a triaxial gyroscope that are configured to detect vibrations of the mat body 10 with respect to multiple (e.g., six) inertial features (e.g., accelerations on X, Y and Z axes and angular velocities about the X, Y and Z axes) so as to generate sensing data. Specifically, the sensing data include an X-axis acceleration signal, a Y-axis acceleration signal, a Z-axis acceleration signal, an X-axis angular velocity signal, a Y-axis angular velocity signal and a Z-axis angular velocity signal. In some embodiments, the inertial sensing module 111 may further include a triaxial magnetometer (not shown), and may generate sensing data that are related to nine inertial features. The microcontroller 112 is configured to receive the sensing data from the inertial sensing module 111, to perform filtering on the sensing data, and to extract a segment (referred to as segment extraction hereinafter) of the sensing data thus filtered to serve as a piece of inertial data, wherein the segment corresponds to a period of time during which the mat body 10 vibrated (for being stepped on). The signal transmitter 113 is configured to receive the piece of inertial data from the microcontroller 112, and to transmit the piece of inertial data through radio waves at a radio frequency.

The signal receiver 3 is configured to wirelessly receive, from each of the inertial sensors 11, the piece of inertial data transmitted by the signal transmitter 113 of the inertial sensor 11. In some embodiments, the signal transmitter 113 and the signal receiver 3 are implemented to be a radio transmitter and a radio receiver that are in communication with each other through wireless technologies, such as but not limited to, Wi-Fi, Bluetooth, cellular networks, etc.

In some embodiments, the processor 4 is implemented by a central processing unit, a digital signal processor, a graphics processing unit or a field-programmable gate array.

The storage device 2 is configured to store a gait similarity estimation model and a plurality of training data sets. In some embodiments, the storage device 2 is implemented by a memory, and more particularly to a non-volatile memory, such as but not limited to, a hard disk drive, flash memory or a solid-state drive.

In some embodiments, the output device 5 is implemented by another signal transmitter that is configured to output signals in wired and/or wireless manners.

Figure 4:
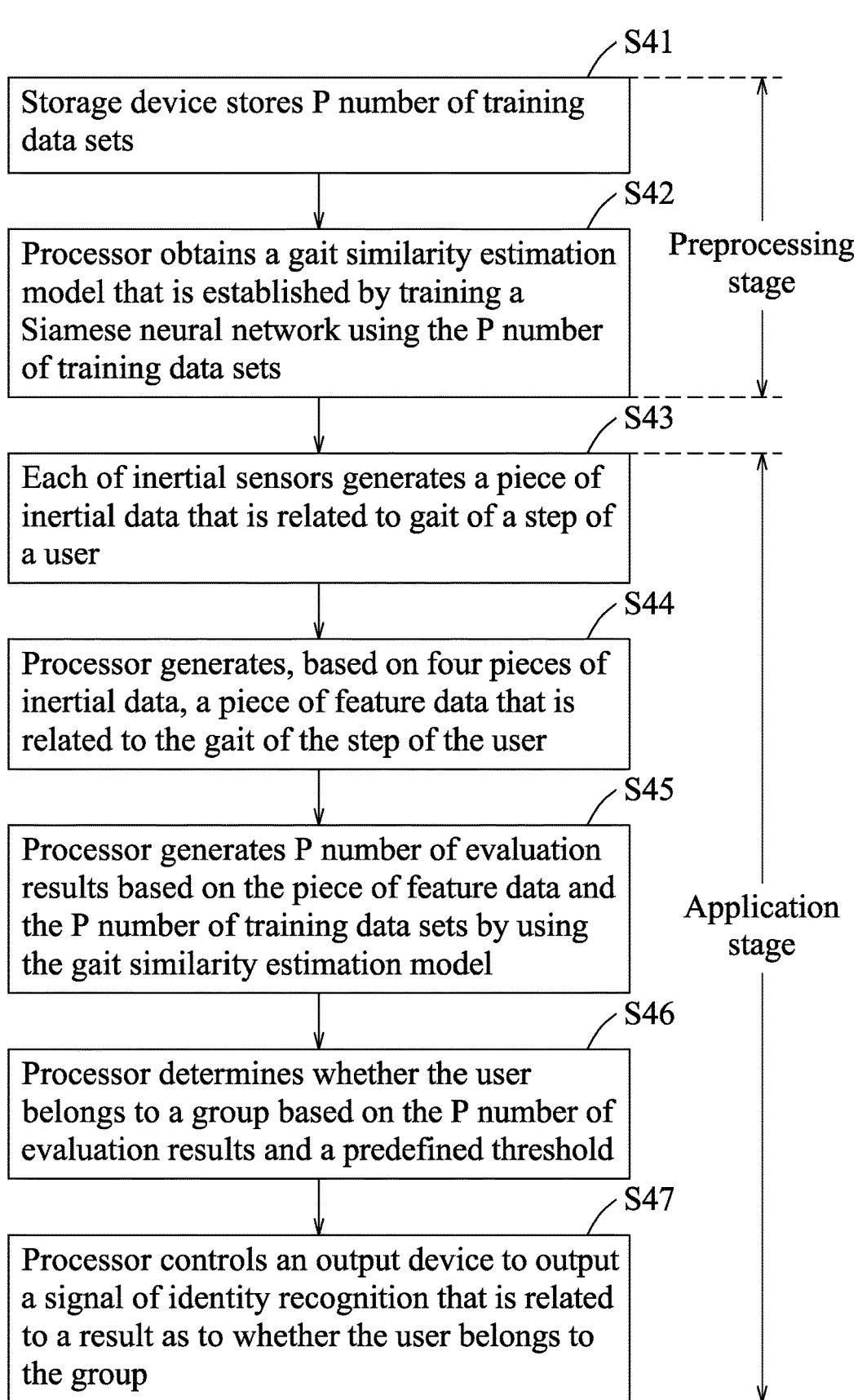
FIG. 4 is a flow chart illustrating an embodiment of an identity recognition method according to the disclosure.

Referring to FIG. 4, an identity recognition method according to an embodiment of the disclosure is illustrated. The identity recognition method is adapted for determining whether a user belongs to a group consisting of P number of members based on gait recognition, where P is an integer greater than zero. The identity recognition method is to be implemented by the identity recognition system 100 exemplarily illustrated in FIG. 1, and includes steps S41 and S42 that correspond to a preprocessing stage and S43 to S47 that correspond to an application stage.

In step S41, the storage device 2 stores P number of training data sets that respectively correspond to the P number of members and that are respectively related to gaits of the P number of members. Each of the P number of training data sets includes Q pieces of training feature data that respectively correspond to Q number of steps taken by the corresponding one of the P number of members on at least one sensor mat 1 and that were generated based on an inertial sensing result generated by the at least one sensor mat 1 which is able to detect vibrations with respect to multiple inertial features, where Q is an integer greater than one.

Figure 5:
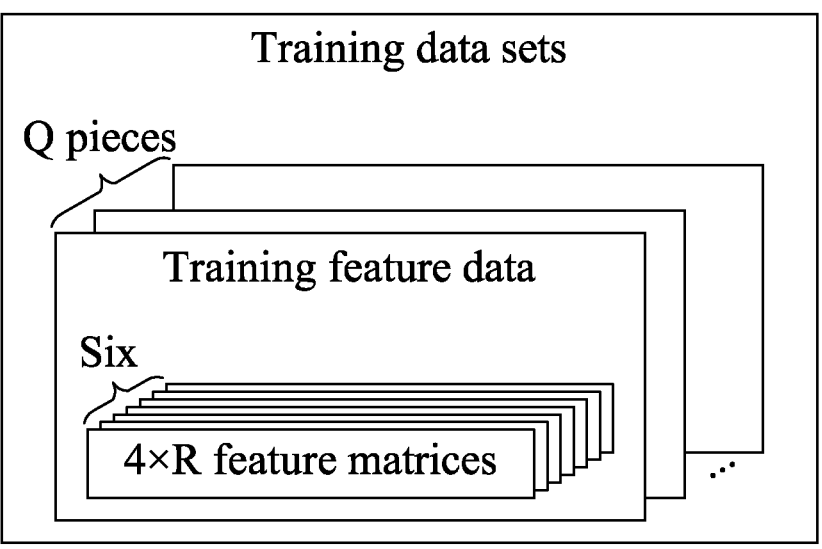
FIG. 5 is a schematic diagram illustrating an embodiment of data content of a training data set according to the disclosure.

For example, in order to obtain the P number of training data sets, each of the P number of members takes Q number of steps on a plurality of sensor mats 1 that are spaced apart from each other at appropriate intervals such that each step falls on a unique sensor mat. While each of the Q number of steps is taken, each of four inertial sensors 11 of a corresponding one of the sensor mats 1 (see FIG. 2) outputs a piece of inertial data that includes six inertial sensing signals which are the X-axis acceleration signal, the Y-axis acceleration signal, the Z-axis acceleration signal, the X-axis angular velocity signal, the Y-axis angular velocity signal and the Z-axis angular velocity signal that have undergone the filtering and segment extraction. In other words, the inertial sensing result generated by the at least one sensor mat 1 includes the pieces of inertial data outputted by the inertial sensors 11 of the at least one sensor mat 1. Subsequently, for each of the Q number of steps, the processor 4 receives, via the signal receiver 3, twenty-four inertial sensing signals (i.e., four groups of the six inertial sensing signals) that are outputted by the four inertial sensors 11 and that correspond to the step, and performs sampling at a sampling rate of R on each of the twenty-four inertial sensing signals to obtain six 4×R feature matrices that respectively correspond to the six inertial features and that serve as one of the Q pieces of training feature data that corresponds to the step (see FIG. 5). In this way, the processor 4 is able to obtain the Q pieces of training feature data that respectively correspond to the Q steps taken by one of the P number of members. Accordingly, the processor 4 eventually obtains the P number of training data sets that respectively correspond to the P number of members, and stores the P number of training data sets in the storage device 2. In some embodiments, Q and R may be, but not limited to, 13 and 150 Hz, respectively.

It is noted that, in some embodiments, in a scenario where a sensor mat 1 that includes more than four inertial sensors 11 is used to collect a piece of training feature data that corresponds to an individual step taken by a specific member, the processor 4 performs sampling at the sampling rate of R on each of four groups of the six inertial sensing signals that are generated by four inertial sensors 11 that are closest, among all the inertial sensors 11, to a spot at which the individual step falls on the sensor mat 1 (e.g., based on magnitudes of the inertial sensing signals), so as to obtain the piece of training feature data.

Figure 6:
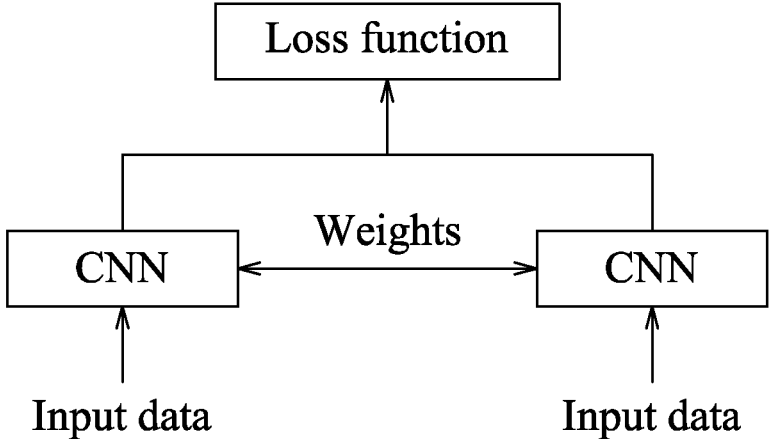
FIG. 6 is a schematic diagram illustrating an embodiment of an architecture of a Siamese neural network according to the disclosure.

In step S42, the processor 4 obtains a gait similarity estimation model that is established by training a Siamese neural network using the P number of training data sets in such a manner that, for each round of training, two pieces of training feature data, which are selected from among the training feature data of the P number of training data sets as two pieces of input data and which respectively correspond to two different steps, are simultaneously inputted into the Siamese neural network to adjust weights used by the Siamese neural network. Referring to FIG. 6, the Siamese neural network includes two convolutional neural networks (CNNs) that share the weights, and a loss function that receives outputs from the CNNs. Each of the CNNs includes an input layer, a plurality of hidden layers and an output layer. In some embodiments, the input layer and the hidden layers each have 512 channels, and the hidden layers include a first convolution layer, a first pooling layer, a second convolution layer, a second pooling layer and a fully-connected layer.

Figure 7:
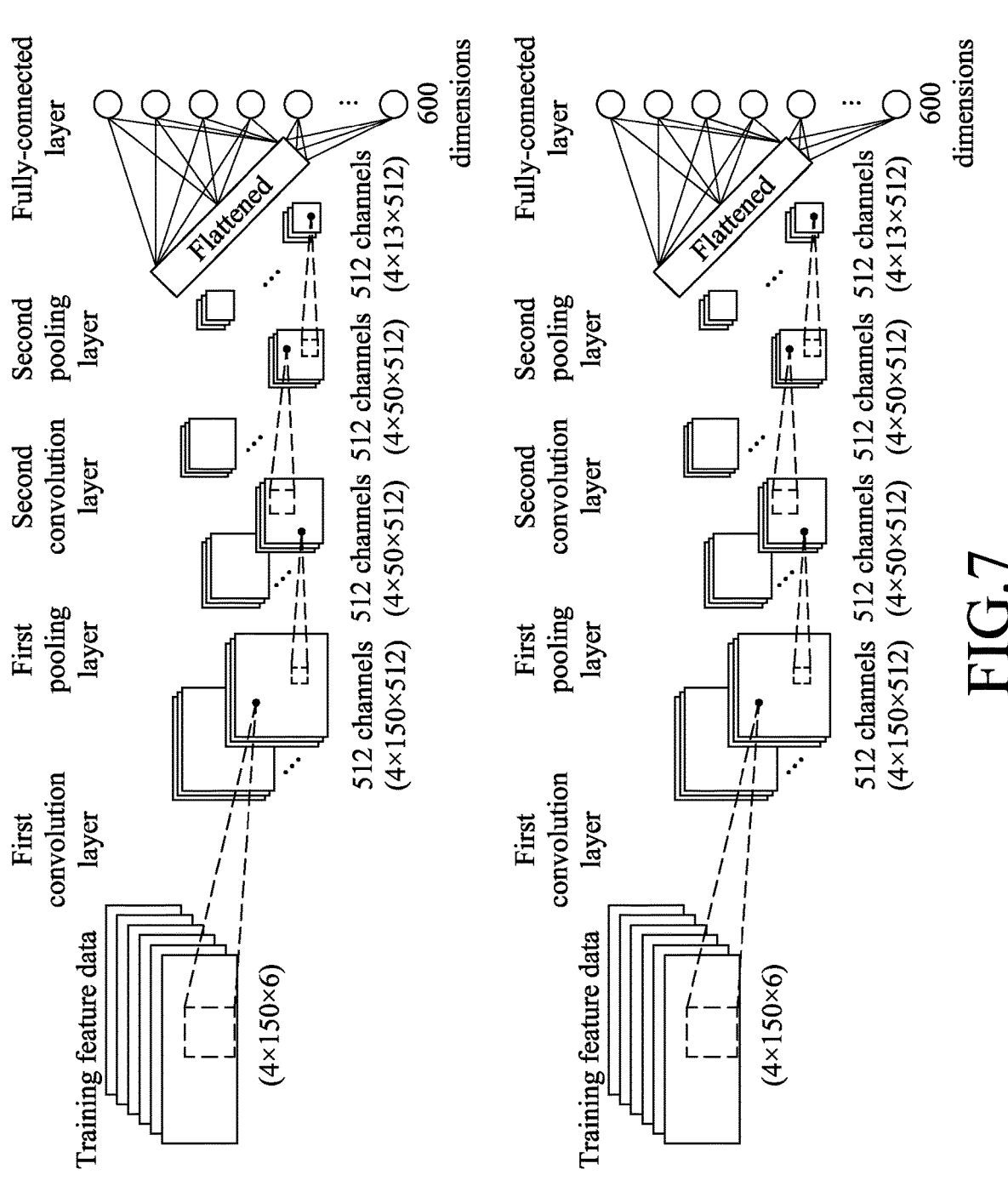
FIG. 7 is a schematic diagram illustrating an embodiment of hidden layers in two convolutional neural networks of a Siamese neural network according to the disclosure.

Specifically, referring to FIG. 7, for each of the CNNs, the input layer receives a piece of training feature data (e.g., six 4×150 feature matrices that respectively correspond to the six inertial features); the first convolutional layer performs filtering with a filter kernel having a kernel size of 4×4, and zero padding on the six 4×150 feature matrices to obtain 512 number of 4×150 feature maps; the first pooling layer performs max-pooling and downsampling with a factor of 1×3 on the 512 number of 4×150 feature maps to obtain 512 number of 4×50 feature maps; the second convolutional layer performs filtering with a filter kernel having a kernel size of 3×3, and zero padding on the 512 number of 4×50 feature maps to obtain 512 number of 4×50 feature maps; the second pooling layer performs max-pooling and downsampling with a factor of 1×4 on the 512 number of 4×50 feature maps outputted by the second convolution layer to obtain 512 number of 4×13 feature maps; and the fully-connected layer flattens the 512 number of 4×13 feature maps to result in 1×26624 feature vectors, and then performs batch normalization, rectified linear unit (ReLU) activation function and dropout on the 1×26624 feature vectors to obtain an N-dimensional feature vector (N is exemplified to be 600). In this way, for each round of training, a processor (for example, but not limited to the processor 4) inputs two pieces of training feature data that respectively correspond to two different steps into the respective CNNs which perform the aforementioned processing, then feeds two N-dimensional feature vectors outputted by the respective CNNs into the loss function for calculation in order to obtain a similarity value that represents a similarity between gaits of the two different steps and that ranges, for example but not limited to, from 0 to 1, and next adjusts the weights shared by the two CNNs based on the similarity value. The aforementioned procedure is repeated until all of the pieces of training feature data of the P number of training data sets have been fed into the Siamese neural network so as to finish training. The processor 4 makes the Siamese neural network thus trained serve as the gait similarity estimation model, and stores the gait similarity estimation model in the storage device 2 for use in the subsequent application stage.

In some embodiments, the processor 4 is further configured to obtain P number of testing data sets that respectively correspond to the P number of members in the group, and to test or verify an accuracy of the gait similarity estimation model by using the P number of testing data sets. In some embodiments, generation of the P number of testing data sets and data contents thereof may be conducted in the same manner as generation of the P number of training data sets.

In step S43, the at least one sensor mat 1 generates at lease one piece of inertial data that corresponds to a step taken by the user, whose identity is to be recognized, on the at least one sensor mat 1 by detecting vibrations resulting from the step with respect to the inertial features. In some embodiments where the sensor mat 1 includes four inertial sensors 11 as shown in FIG. 2, each of the inertial sensors 11 generates, while the user takes one step on the top surface 101 of the mat body 10 of the sensor mat 1, a piece of inertial data that is related to gait of the step of the user, and outputs the piece of inertial data. The piece of inertial data outputted by each of the inertial sensors 11 includes six inertial sensing signals which are the X-axis acceleration signal, the Y-axis acceleration signal, the Z-axis acceleration signal, the X-axis angular velocity signal, the Y-axis angular velocity signal and the Z-axis angular velocity signal that have undergone the filtering and segment extraction. In other embodiments where the user takes one step on the sensor mat 1 that includes more than four inertial sensors 11, similarly, each of the inertial sensors 11 generates the piece of inertial data that is related to gait of the step of the user, and outputs the piece of inertial data.

In step S44, the processor 4 generates, based on the at least one piece of inertial data, a piece of feature data that is related to the gait of the step taken by the user. In the example shown in FIGS. 1 and 2, the processor 4 receives, via the signal receiver 3, the four pieces of inertial data respectively outputted by the four inertial sensors 11, and generates, based on the four pieces of inertial data, the piece of feature data that is related to the gait of the step taken by the user. Specifically, the processor 4 performs sampling at a sampling rate of R on each of four groups of the six inertial sensing signals (i.e., the four pieces of inertial data) to obtain six 4×R feature matrices that respectively correspond to the six inertial features, and makes the six 4×R feature matrices serve as the piece of feature data. In some embodiments where the processor 4 receives more than four pieces of inertial data respectively outputted by more than four inertial sensors 11 included in one sensor mat 1, the processor 4 would generate the piece of feature data by performing sampling on each of four groups of the six inertial sensing signals which are generated by four inertial sensors 11 that are closest, among all the inertial sensors 11, to a spot at which the step fell on the sensor mat 1 (e.g., based on magnitudes of the inertial sensing signals).

In step S45, the processor 4 generates P number of evaluation results that respectively correspond to the P number of training data sets by using the gait similarity estimation model based on the piece of feature data and the P number of training data sets stored in the storage device 2, wherein, with respect to each of the P number of training data sets, the corresponding evaluation result includes Q number of similarity values each between the piece of feature data and a respective one of the Q pieces of training feature data of the training data set. Specifically, with respect to each of the P number of training data sets, the processor 4 performs Q rounds of evaluation by using the gait similarity estimation model based on the piece of feature data and the Q pieces of training feature data of the training data set to obtain the corresponding evaluation result that includes the Q number of similarity values. For each round of evaluation (i.e., with respect to each of the Q pieces of training feature data of each of the P number of training data sets), the processor 4 inputs the piece of feature data and the piece of training feature data respectively into the two input layers of the two CNNs, the two hidden layers of the two CNNs then respectively process the piece of feature data and the piece of training feature data, so that the two output layers of the two CNNs respectively output two N-dimensional feature vectors that respectively correspond to the piece of feature data and the piece of training feature data, and lastly, the loss function calculates the respective one of the Q number of similarity values between the piece of feature data and the piece of training feature data based on the N-dimensional feature vectors outputted by the two output layers of the two CNNs.

In step S46, the processor 4 determines whether the user belongs to the group consisting of the P number of members based on the P number of evaluation results and a predefined threshold. The threshold may be, for example but not limited to, 0.5. Specifically, for each of the P number of evaluation results, the processor 4 compares each of the Q number of similarity values of the evaluation result with the predefined threshold; when none of the Q number of similarity values is determined to be smaller than the predefined threshold, the processor 4 determines that the user belongs to the group and identifies the user as a specific member among the P number of members that corresponds to the evaluation result (i.e., the member to which the training data set corresponding to the evaluation result corresponds); and when all of the Q number of similarity values are determined to be smaller than the predefined threshold, the processor 4 determines that the user is not the specific member that corresponds to the evaluation result. In some embodiments, the processor 4 determines that the user does not belong to the group when the processor 4 determines that the user is not any of the P number of members.

In step S47, the processor 4 generates a signal of identity recognition based on a result as to whether the user belongs to the group made in step S46, and controls the output device 5 to output the signal of identity recognition for subsequent processing and application. For example, if the result indicates that the user is a specific member of the group, the signal of identity recognition would indicate a positive result of identity recognition, and a household door lock system (or an access control system) would unlock in response to receipt of the signal of identity recognition. In contrast, if the result indicates that the user is not any member of the group, the signal of identity recognition would indicate a negative result of identity recognition, and the household door lock system would keep being locked up in response to receipt of the signal of identity recognition.

It is noted that when the user is determined as belonging to the group and is identified as a specific member of the group, the processor 4 updates the piece of training data set that is stored in the storage device 2 and that corresponds to the specific member based on the piece of feature data, and allows subsequent adjustment of weights used by the gait similarity estimation model (i.e., the Siamese neural network thus trained) stored in the storage device 2. Specifically, for example, the evaluation result that is generated by using the gait similarity estimation model based on the piece of feature data that corresponds to the user and the training data set that corresponds to the specific member (e.g., thirteen pieces of training feature data that respectively correspond to thirteen steps taken by the specific member) includes thirteen similarity values listed in the table below.

| Step corresponding to training feature data | Similarity value |
|---|---|
| 1 | 0.65 |
| 2 | 0.9 |

-continued

| Step corresponding to training feature data | Similarity value |
| --- | --- |
| 3 | 0.83 |
| 4 | 0.8 |
| 5 | 0.76 |
| 6 | 0.71 |
| 7 | 0.69 |
| 8 | 0.81 |
| 9 | 0.95 |
| 10 | 0.88 |
| 11 | 0.69 |
| 12 | 0.79 |
| 13 | 0.55 |

In order to ensure data diversity of the training data set that corresponds to the specific member in terms of gait features, the processor 4 substitutes the piece of feature data of the user who has been successfully recognized for the piece of training feature data that corresponds to the highest similarity value (i.e., the second piece of training feature data in the table that corresponds to a similarity value of 0.9), so as to update the training data set that corresponds to the specific member and that is stored in the storage device 2. In this way, each time the identity of a user is recognized, the corresponding training data set is updated in the fashion described above. Until more than half of the Q pieces of training feature data (e.g., at least seven pieces of training feature data) have been replaced with respect to each of the training data sets, the processor 4 may then perform model retraining on the gait similarity estimation model by tuning the weights shared by the two CNNs based on the training data sets that have been updated and that are stored in the storage device 2, so as to optimize the gait similarity estimation model.

In some embodiments, in order to ensure that each of the training data sets stored in the storage device 2 is most representative of the latest gait of the corresponding member (i.e., to maintain data freshness), the processor 4 may be configured to store the piece of feature data of a user, who has been successfully recognized as a specific member, in the storage device 2 in such a manner that the piece of feature data is additionally added into the training data set that corresponds to the specific member (e.g., the piece of feature data serving as the fourteenth piece of training feature data in the training data set), so as to expand data content of the training data sets. In this way, when the processor 4 performs identity recognition next time, the evaluation result corresponding to the training data set that has been expanded would include more than Q number of similarity values. With respect to the evaluation result that includes more than Q number of similarity values, in one embodiment, the processor 4 determines whether a user is a specific member that corresponds to the evaluation result in a way that is a bit similar to step S46 described previously, in which the processor 4 determines whether the evaluation result includes at least Q number of similarity values that are not smaller than the threshold and in the affirmative, identifies the user as a specific member among the P number of members that corresponds to the evaluation result. In this way, each time the identity of a user is recognized, the corresponding training data set is updated through data content expansion as described above. Until each of the training data sets includes 2×Q pieces of training feature data (i.e., data content doubled in each training data set), the processor 4 then performs model retraining on the gait similarity estimation model by tuning the weights shared by the two CNNs based on the training data sets that have been updated and that are stored in the storage device 2, so as to optimize the gait similarity estimation model.

To sum up, a gait similarity estimation model that is established by training a Siamese neural network using P number of training data sets that respectively correspond to gaits of P number of members is provided for identity recognition. A processor obtains at least one piece of inertial data that corresponds to a step taken by the user on a sensor mat and that is generated by the sensor mat, and uses the gait similarity estimation model to calculate similarity values related to gait of the user and gaits of the P number of members, so as to determine whether the user is a specific member among the P number of members. In this way, the identity of the user may be recognized with a high accuracy. Moreover, since the piece of inertial data is collected from the user based on gait of the user, which is a type of biometric feature that is portable, memory-free, unique, difficult to copy or counterfeit, and collectable in a non-contact way, security of identity recognition may be promoted by the method and system according this disclosure.

In addition, a plurality of sensor mats that are combined together and a computer system that stores a trained Siamese neural network (i.e., a gait similarity estimation model) can constitute a portable gait analysis system, which may be used to analyze gait parameters of a subject, such as step frequency, step length, step width, step distance, step speed, etc., and to perform clinical sitting, standing, rising and walking tests. These data collected and analyzed can be used not only for identity recognition but also to realize a digital medical gait system.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An identity recognition method for determining whether a user belongs to a group consisting of P number of members based on gait recognition, where P is a positive integer, the identity recognition method to be implemented by an identity recognition system and comprising:

storing P number of training data sets that respectively correspond to the P number of members and that are respectively related to gaits of the P number of members, each of the P number of training data sets including Q pieces of training feature data that respectively correspond to Q number of steps taken by a corresponding one of the P number of members on at least one sensor mat and that are obtained based on an inertial sensing result generated by the at least one sensor mat which is capable of detecting vibrations with respect to multiple inertial features, where Q is an integer greater than one;

obtaining a gait similarity estimation model that is established by training a Siamese neural network using the P number of training data sets in such a manner that, for each round of training, two pieces of training feature data, which are selected from among the P number of training data sets as two pieces of input data and which respectively correspond to two different steps, are simultaneously inputted into the Siamese neural network to adjust weights used by the Siamese neural network;

obtaining at least one piece of inertial data that corresponds to a step taken by the user on the at least one sensor mat and that is generated by the at least one sensor mat which detects vibrations resulting from the step with respect to the inertial features;

generating, based on the at least one piece of inertial data, a piece of feature data that is related to gait of the step taken by the user;

based on the piece of feature data and the P number of training data sets, generating P number of evaluation results that respectively correspond to the P number of training data sets by using the gait similarity estimation model, wherein, with respect to each of the P number of training data sets, the corresponding evaluation result includes Q number of similarity values each between the piece of feature data and a respective one of the Q pieces of training feature data of the training data set;

determining whether the user belongs to the group consisting of the P number of members based on the P number of evaluation results and a predefined threshold; and unlocking an access control system by outputting a signal of identity recognition which indicates a positive result of identity recognition to the access control system when it is determined that the user belongs to the group, wherein each of the at least one sensor mat includes multiple inertial sensors that are arranged in an array on a surface of the at least one sensor mat, each of the inertial sensors detecting accelerations and angular velocities in three axes that represent the inertial features to generate six inertial sensing signals, and wherein, in the storing P number of training data sets, each of the Q pieces of training feature data of each of the P number of training data sets includes six 4×R feature matrices that respectively correspond to the inertial features, and that were obtained by performing sampling at a sampling rate of R on each of four groups of the six inertial sensing signals which were generated by four inertial sensors that are closest, among all the inertial sensors, to a spot at which the corresponding step taken by the corresponding member fell on the at least one sensor mat.

2. The identity recognition method as claimed in claim 1, wherein in the generating a piece of feature data, the piece of feature data includes six 4×R feature matrices that respectively correspond to the inertial features, and that are obtained by performing sampling at a sampling rate of R on each of four groups of the six inertial sensing signals which are generated by four inertial sensors that are closest, among all the inertial sensors, to a spot at which the step taken by the user falls on the at least one sensor mat.

3. The identity recognition method as claimed in claim 1, wherein:

in the obtaining a gait similarity estimation model, the gait similarity estimation model includes two convolutional neural networks (CNNs) that share the weights, and a loss function that receives outputs from the CNNs, each of the CNNs including an input layer, a plurality of hidden layers and an output layer.

4. The identity recognition method as claimed in claim 3, wherein:

in the generating P number of evaluation results, with respect to each of the Q pieces of training feature data of each of the P number of training data sets, the piece of feature data and the piece of training feature data are respectively inputted into the input layers of the CNNs, the hidden layers of the CNNs respectively process the piece of feature data and the piece of training feature data, so that the output layers of the CNNs respectively output two N-dimensional feature vectors that respectively correspond to the piece of feature data and the piece of training feature data, and the loss function calculates the respective one of the Q number of similarity values between the piece of feature data and the piece of training feature data based on the N-dimensional feature vectors outputted by the output layers of the CNNs.

5. The identity recognition method as claimed in claim 1, wherein the determining whether the user belongs to the group consisting of the P number of members includes, for each of the P number of evaluation results:

comparing each of the Q number of similarity values of the evaluation result with the predefined threshold;

when none of the Q number of similarity values is determined to be smaller than the predefined threshold, determining that the user belongs to the group and identifies the user as a specific member among the P number of members that corresponds to the evaluation result; and when all of the Q number of similarity values are determined to be smaller than the predefined threshold, determining that the user is not the specific member that corresponds to the evaluation result.

6. The identity recognition method as claimed in claim 5, further comprising:

when the user is determined to belong to the group and is identified as the specific member, updating, based on the piece of feature data, the piece of training data set that corresponds to the specific member, so as to allow subsequent adjustment of weights used by the gait similarity estimation model.

7. An identity recognition system for determining whether a user belongs to a group consisting of P number of members based on gait recognition, where P is a positive integer, the identity recognition system comprising:

a sensor mat that includes a mat body having a top surface and a bottom surface opposite to each other, and multiple inertial sensors arranged in an array on said bottom surface of said mat body and each including an inertial sensing module that is configured to detect vibrations of said mat body with respect to multiple inertial features to generate sensing data that is related to the inertial features, a microcontroller that is electrically connected to said inertial sensing module, and that is configured to receive the sensing data from said inertial sensing module, to perform filtering on the sensing data, and to extract a segment of the sensing data thus filtered to serve as a piece of inertial data, wherein the segment corresponds to a period of time during which said mat body vibrated, and a signal transmitter that is electrically connected to said microcontroller, and that is configured to receive the piece of inertial data from said microcontroller, and to transmit the piece of inertial data through radio waves at a radio frequency;

a storage device storing P number of training data sets that respectively correspond to the P number of members and that are respectively related to gaits of the P number of members, and storing a gait similarity estimation model that is established by training a Siamese neural network using the P number of training data sets, each of the P number of training data sets including Q pieces of training feature data that respectively correspond to Q number of steps taken by the corresponding one of the P number of members on said top surface of said mat body and that were obtained based on an inertial sensing result generated by said sensor mat, where Q is an integer greater than one;

a signal receiver that is configured to wirelessly receive the pieces of inertial data transmitted by said signal transmitters of said inertial sensors; and a processor that is electrically connected to said signal receiver and that is configured to obtain the pieces of inertial data that correspond to a step taken by the user on said sensor mat and that were generated by said inertial sensors which detect vibrations resulting from the step with respect to the inertial features;

generate, based on the pieces of inertial data, a piece of feature data that is related to gait of the step taken by the user;

based on the piece of feature data and the P number of training data sets, generate P number of evaluation results that respectively correspond to the P number of training data sets by using the gait similarity estimation model, wherein, with respect to each of the P number of training data sets, the corresponding evaluation result includes Q number of similarity values each between the piece of feature data and a respective one of the Q pieces of training feature data of the training data set, determine whether the user belongs to the group consisting of the P number of members based on the P number of evaluation results and a predefined threshold, and unlock an access control system by outputting a signal of identity recognition which indicates a positive result of identity recognition to the access control system when it is determined that the user belongs to the group;

wherein for each of said inertial sensors, said inertial sensing module includes a triaxial accelerometer and a triaxial gyroscope that are configured to detect accelerations and angular velocities in three axes which represent the inertial features to generate the sensing data, and said microcontroller performs filtering and segment extraction on the sensing data to result in the piece of inertial data that includes six inertial sensing signals; and wherein each of the Q pieces of training feature data of each of the P number of training data sets stored in said storage device includes six 4×R feature matrices that respectively correspond to the inertial features, and that were obtained by performing sampling at a sampling rate of R on each of four groups of the six inertial sensing signals that were generated by four inertial sensors that are closest, among all said inertial sensors, to a spot at which the corresponding step taken by the corresponding member fell on said sensor mat.

8. The identity recognition system as claimed in claim 7, wherein the processor performs sampling at a sampling rate of R on each of four groups of the six inertial sensing signals which are generated by four inertial sensors that are closest, among all said inertial sensors, to a spot at which the step taken by the user falls on the at least one sensor mat to obtain six 4×R feature matrices, and the piece of feature data includes the six 4×R feature matrices that respectively correspond to the inertial features.

9. The identity recognition system as claimed in claim 7, wherein:

the gait similarity estimation model stored in said storage device includes two convolutional neural networks (CNNs) that share the weights, and a loss function that receives outputs from the CNNs, each of the CNNs including an input layer, a plurality of hidden layers and an output layer.

10. The identity recognition system as claimed in claim 9, wherein:

in generating P number of evaluation results, with respect to each of the Q pieces of training feature data of each of the P number of training data sets, the piece of feature data and the piece of training feature data are respectively inputted into the input layers of the CNNs, the hidden layers of the CNNs respectively process the piece of feature data and the piece of training feature data, so that the output layers of the CNNs respectively output two N-dimensional feature vectors that respectively correspond to the piece of feature data and the piece of training feature data, and the loss function calculates the respective one of the Q number of similarity values between the piece of feature data and the piece of training data based on the N-dimensional feature vectors outputted by the output layers of the CNNs.

11. The identity recognition system as claimed in claim 7, wherein said processor is configured to, for each of the P number of evaluation results:

compare each of the Q number of similarity values of the evaluation result with the predefined threshold;

when none of the Q number of similarity values are determined to be smaller than the predefined threshold, determine that the user belongs to the group and identify the user as a specific member among the P number of members that corresponds to the evaluation result; and when all of the Q number of similarity values are determined to be smaller than the predefined threshold, determine that the user is not the specific member that corresponds to the evaluation result.

12. The identity recognition system as claimed in claim 11, wherein said processor is further configured to:

when the user is determined as belonging to the group and is identified as the specific member, update, based on the piece of feature data, the piece of training data set that is stored in said storage device and that corresponds to the specific member, so as to allow subsequent adjustment of weights used by the gait similarity estimation model.

\* \* \* \* \*